(12) United States Patent
Weismantel et al.

(10) Patent No.: US 8,546,461 B2
(45) Date of Patent: Oct. 1, 2013

(54) METHOD FOR THE CONTINUOUS PRODUCTION OF WATER-ABSORBENT POLYMER PARTICLES

(75) Inventors: Matthias Weismantel, Jossgrund-Oberndorf (DE); Rüdiger Funk, Niedernhausen (DE); Leigh R. Blair, Greenwood Springs, MS (US); Kevin D. Heitzhaus, Suffolk, VA (US)

(73) Assignee: BASF SE, Ludwigshafen (DE)

( * ) Notice: Subject to any disclaimer, the term of this patent is extended or adjusted under 35 U.S.C. 154(b) by 347 days.

(21) Appl. No.: 12/741,356

(22) PCT Filed: Nov. 24, 2008

(86) PCT No.: PCT/EP2008/066046
§ 371 (c)(1),
(2), (4) Date: May 4, 2010

(87) PCT Pub. No.: WO2009/068490
PCT Pub. Date: Jun. 4, 2009

(65) Prior Publication Data
US 2010/0240793 A1 Sep. 23, 2010

Related U.S. Application Data

(60) Provisional application No. 60/990,045, filed on Nov. 26, 2007.

(51) Int. Cl.
*C08F 2/46* (2006.01)

(52) U.S. Cl.
USPC ............... 522/178; 522/3; 522/113; 522/114; 522/120; 522/121; 522/182; 428/406; 428/323; 526/72; 526/317.1; 526/319

(58) Field of Classification Search
USPC ..................... 428/402, 323; 522/3, 182, 113; 526/72, 317.1, 319
See application file for complete search history.

(56) References Cited

U.S. PATENT DOCUMENTS

| 3,144,601 | A  | * | 8/1964 | Slabodsky | 324/642 |
| 7,977,430 | B2 | * | 7/2011 | Devlin et al. | 525/131 |
| 2004/0115251 | A1 | * | 6/2004 | Goldman et al. | 424/443 |
| 2005/0113549 | A1 | * | 5/2005 | Devlin et al. | 528/44 |
| 2005/0215734 | A1 | * | 9/2005 | Dairoku et al. | 526/72 |

FOREIGN PATENT DOCUMENTS

| EP | 0197423 A1 | * 10/1986 |
| EP | 1 097 946 A2 | 5/2001 |
| EP | 1589040 A1 | 10/2005 |

OTHER PUBLICATIONS

BOROFLOAT.RM. Borosilicate Float Glass Product Information Sheet from Schott North America, Inc (Dec. 2004). [online]. [Retrived online on Dec. 16, 2011]. Retrieved from Internet <URL:// http://www.coresix.com/images/BOROFLOAT_12_04.pdf.>.*
Borofloat Glass Property Sheet from Valley Design Corp. Oct. 1, 2011. [online]. [retreived online on Dec. 16, 2011]. Retrieved from Internet <URL://http://www.valleydesign.com/borofloat.htm.>.*
Buchholz, Fredric L., et al. "Solution Polymerization: Polymerization Vessels and Systems." *Modern Superabsorbent Polymer Technology*, pp. 77-84. New York: John Wiley & Sons, Inc., 1998.

* cited by examiner

*Primary Examiner* — Sanza McClendon
(74) *Attorney, Agent, or Firm* — Marshall, Gerstein & Borun LLP

(57) ABSTRACT

The present invention relates to a method for producing water-absorbing polymer particles by radiation-inducing polymerization on a continuously revolving belt, electromagnetic radiation having a wavelength of greater than 400 nm being shielded.

9 Claims, No Drawings

METHOD FOR THE CONTINUOUS PRODUCTION OF WATER-ABSORBENT POLYMER PARTICLES

CROSS-REFERENCE TO RELATED APPLICATIONS

This is the U.S. national phase of International Application No. PCT/EP2008/066046, filed Nov. 24, 2008, which claims the benefit of U.S. Provisional Patent Application No. 60/990, 045, filed Nov. 26, 2007, incorporated herein by reference in its entirety.

The present invention relates to a process for producing water-absorbing polymer particles by radiation-induced polymerization on a continuous belt, wherein electromagnetic radiation with a wavelength of more than 400 nm is screened out.

Water-absorbing polymers are used to produce diapers, tampons, sanitary napkins and other hygiene articles, but also as water-retaining agents in market gardening.

According to the monograph "Modern Superabsorbent Polymer Technology", F. L. Buchholz and A. T. Graham, Wiley-VCH, 1998, pages 77 to 84, water-absorbing polymers are typically produced in continuous kneading reactors or on continuous belts.

EP 1 097 946 A2 and EP 1 589 040 A1 describe processes for polymerization on continuous belts. According to EP 1 097 946 A2, the upstream region of the belt is cooled. EP 1 589 040 A1 discloses a radiation-induced polymerization.

It was an object of the present invention to provide an improved process for producing water-absorbing polymer particles, especially a process which is not very prone to disruption, and a process for producing qualitatively high-value water-absorbing polymer particles.

The object has been achieved by a process for producing water-absorbing polymer particles by radiation-induced polymerization of a monomer solution or suspension on a continuous belt, wherein a screen for electromagnetic radiation with a wavelength of more than 400 nm is disposed between the radiation source and the monomer solution or suspension and the screen has a thickness of at least 1 mm.

Advantageously, electromagnetic radiation with a wavelength of from 1 mm to 1 m (microwaves) is screened out. Screening out means that the radiation which hits the screen passes through it only partly, if at all.

The type of screen is not subject to any restriction, but the screen should have a sufficient transparency for electromagnetic radiation having a wavelength of from 100 to 350 nm (UV radiation). The preferred screen material is quartz glass. The thickness of the screen is preferably from 1 to 20 mm, more preferably from 2 to 10 mm, most preferably from 2.5 to 7.5 mm.

Below the radiation sources, it is possible, for example, for quartz glass panes of appropriate thickness to be mounted as a screen.

The present invention is based on the finding that the UV radiators typically used in radiation-induced polymerization emit a considerable proportion of long-wavelength electromagnetic radiation. This radiation can lead to uncontrolled heating of the monomer solution or suspension. A suitable screen can significantly reduce this undesired radiation fraction. This prevents overheating, and water-absorbing polymer particles with improved product quality are obtained.

A further advantage of the inventive screen is that the distance between radiation source and monomer solution or suspension can be reduced, without proportions of the monomer solution or suspension spraying onto the radiation source and thus reducing the lifetime of the radiation source.

The distance between radiation source and screen is preferably from 1 to 50 cm, more preferably from 5 to 30 cm, most preferably from 10 to 20 cm.

The distance between monomer solution or suspension and screen is preferably from 30 to 130 cm, more preferably from 60 to 110 cm, most preferably from 70 to 100 cm.

The distance between radiation source and monomer solution or suspension is preferably from 40 to 150 cm, more preferably from 70 to 130 cm, most preferably from 80 to 120 cm.

Advantageously, the region between radiation source and screen is cooled. For this purpose, an air stream is especially suitable.

The screen is typically selected such that preferably less than 50%, more preferably less than 75%, most preferably less than 90%, of the microwaves pass through the screen.

To monitor the screen, microwave detectors can be used. Damage to the screen, for example fractures of quartz glass panes, can thus be detected immediately.

In the process according to the invention, it is possible to use, for example, monomer solutions or suspensions comprising a) at least one ethylenically unsaturated monomer bearing acid groups, which may be at least partly neutralized,
b) at least one crosslinker,
c) optionally one or more ethylenically and/or allylically unsaturated monomers copolymerizable with the monomers mentioned under a), and
d) optionally one or more water-soluble polymers.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

Further suitable monomers a) are, for example, ethylenically unsaturated sulfonic acids such as styrenesulfonic acid and 2-acrylamido-2-methylpropanesulfonic acid (AMPS).

The content of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

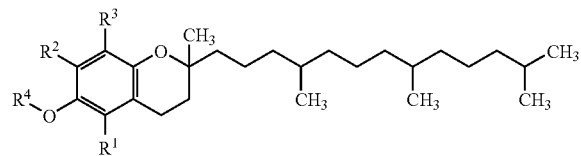

where $R^1$ is hydrogen or methyl. $R^2$ is hydrogen or methyl. $R^3$ is hydrogen or methyl and $R^4$ is hydrogen or an acyl radical having from 1 to 20 carbon atoms.

Preferred R⁴ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3$=methyl, especially racemic alpha-tocopherol. $R^1$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

Crosslinkers b) are compounds having at least two polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylammonium chloride, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinker b) is preferably from 0.05 to 1.5% by weight, more preferably from 0.1 to 1% by weight, most preferably from 0.3 to 0.6% by weight, based in each case on monomer a).

Examples of ethylenically unsaturated monomers c) which are copolymerizable with the ethylenically unsaturated monomers a) bearing acid groups are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

Suitable photoinitiators include, for example, α-splitters. H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds, such as the free radical formers mentioned above, substituted hexaarylbisimidazoles or acylphosphine oxides, especially 2-hydroxy-2-methylpropiophenone (Darocure® 1173). Examples of azides are 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl)maleimide. N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene)cyclohexanone and 2,6-bis(p-azidobenzylidene)-4-methylcyclohexanone.

Polymerization on a continuous belt forms a polymer gel, which is typically comminuted in a further process step, for example in a meat grinder, extruder or kneader.

The acid groups of the resulting polymer gels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the polymer gel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The polymer gel is then preferably dried with a belt dryer until the residual moisture content is preferably below 15% by weight and especially below 10% by weight, the water content being determined by EDANA (European Disposables and Nonwovens Association) recommended test method No. WSP 230.2-05 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 25% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried polymer gel is typically ground and classified, and the apparatus used for grinding may preferably be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA (European Disposables and Nonwovens Association) recommended test method No. WSP 220.2-05 "Particle size distribution", where the proportions by mass of the screen fractions are plotted in cumulated form and the mean particle size is determined graphically. The mean particle size here is the value of the mesh size which gives rise to a cumulative 50% by weight.

To further improve the properties, the polymer particles may be postcrosslinked. Suitable postcrosslinkers are compounds which comprise at/east two groups which can form covalent bonds with the carboxylate groups of the polymer gel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer.

In a preferred embodiment of the present invention, polyvalent cations are applied to the particle surface in addition to the postcrosslinkers.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer.

The postcrosslinking is typically performed in such a way that a solution of the postcrosslinker is sprayed onto the polymer gel or the dry polymer particles. After the spraying, the polymer particles coated with the postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C. The preferred residence time at this temperature in the reaction mixer or dryer is preferably at least 10 minutes, more preferably at least 20 minutes, most preferably at least 30 minutes.

Subsequently, the postcrosslinked polymer can be classified again.

To further improve the properties, the postcrosslinked polymer particles can be coated or subsequently moistened. Suitable coatings for improving the acquisition behavior and the permeability (SFC) are, for example, inorganic inert substances, organic polymers, cationic polymers and di- or polyvalent metal cations. Suitable coatings for dust binding are, for example, polyols.

The invention claimed is:

1. A process for producing water-absorbing polymer particles by radiation-induced polymerization of a monomer solution or suspension on a continuous belt, wherein a screen for electromagnetic radiation with a wavelength of more than 400 nm is disposed between a radiation source and the monomer solution or suspension for screening out radiation having a wavelength more than 400 nm, the screen having a thickness of at least 1 mm, and damage to the screen is determined by a microwave detector.

2. The process according to claim 1, wherein a screen for electromagnetic radiation with a wavelength of from 1 mm to 1 m is disposed between the radiation source and the monomer solution or suspension for screening out radiation having a wavelength of from 1 mm to 1 m.

3. The process according to claim 1, wherein the screen is made of quartz glass.

4. The process according to claim 1, wherein a distance between the radiation source and screen is at least 1 cm.

5. The process according to claim 1, wherein a distance between the monomer solution or suspension and the screen is at least 30 cm.

6. The process according to claim 1, wherein a distance between the radiation source and the monomer solution or suspension is less than 2 m.

7. The process according to claim 1, wherein a region between the radiation source and the screen is cooled.

8. The process according to claim 1, wherein a region between the radiation source and the screen is cooled with air.

9. The process according to claim 1, wherein less than 50% of rays with a wavelength of from 1 mm to 1 m pass through the screen.

* * * * *